United States Patent
Lampe et al.

(10) Patent No.: US 8,477,671 B2
(45) Date of Patent: Jul. 2, 2013

(54) COMMUNICATION METHOD, SYSTEM AND NETWORK NODES IN A LOW POWER COMMUNICATION NETWORK

(75) Inventors: Mattias Lampe, Wolfenbuettel (DE); Juan Juan Li, Beijing (CN); Jie Tong, Beijing (CN); Jin Wu, Horsham (GB); Fan Yang, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 141 days.

(21) Appl. No.: 12/739,671

(22) PCT Filed: Oct. 24, 2008

(86) PCT No.: PCT/EP2008/064484
§ 371 (c)(1),
(2), (4) Date: Apr. 7, 2011

(87) PCT Pub. No.: WO2009/053480
PCT Pub. Date: Apr. 30, 2009

(65) Prior Publication Data
US 2011/0176467 A1 Jul. 21, 2011

(30) Foreign Application Priority Data
Oct. 25, 2007 (CN) .......................... 2007 1 0181439

(51) Int. Cl.
*H04W 52/02* (2009.01)

(52) U.S. Cl.
USPC ............................ 370/311; 370/241; 370/310

(58) Field of Classification Search
USPC .......................................... 370/311, 310, 328
See application file for complete search history.

(56) References Cited

U.S. PATENT DOCUMENTS

| 2005/0068928 A1 | 3/2005 | Simpson |
| 2006/0030362 A1 | 2/2006 | Fukuda |
| 2006/0205421 A1 | 9/2006 | Record |
| 2006/0285507 A1* | 12/2006 | Kinder et al. ................. 370/310 |

FOREIGN PATENT DOCUMENTS

| EP | 1548984 | * | 6/2005 |
| EP | 1548984 A1 | | 6/2005 |
| WO | WO 2005053248 A1 | | 6/2005 |
| WO | WO 2006138058 A2 | | 12/2006 |
| WO | WO 2007029973 A1 | | 3/2007 |

OTHER PUBLICATIONS

Mike Baker et al: "Measurement Collection for Neighbor Tracking and Handover in an IEEE 802.11 Home Environment", World Wireless Congress, May 1, 2005, pp. 1-7, XP 008080620, pp. 197-198, paragraph IV.

* cited by examiner

*Primary Examiner* — Dang Ton
*Assistant Examiner* — Pamit Kaur
(74) *Attorney, Agent, or Firm* — Cozen O'Connor

(57) ABSTRACT

The present invention provides a communication method in a low power communication network, a corresponding low power communication network system and a network node, which enables low power consumption by the data transmission node in the low power communication network while ensuring the communication efficiency of the low power communication network. In this case, the network comprises a first network node and a second network node; the first network node transmits a beacon frame, said beacon frame is used to indicate the time for data transmission by the first network node; the second network node detects said beacon frame to synchronize its data transmission with the first network node. Furthermore, the first network node transmits a dummy beacon frame before it transmits the beacon frame, said dummy beacon frame is used to indicate the time for transmitting the beacon frame; the second network node detects the dummy beacon frame before it detects the beacon frame to acquire the time for transmitting the beacon frame, and carries out data transmission with the first network node synchronously after it has detected the beacon frame.

7 Claims, 2 Drawing Sheets

COMMUNICATION METHOD, SYSTEM AND NETWORK NODES IN A LOW POWER COMMUNICATION NETWORK

CROSS-REFERENCE TO RELATED APPLICATIONS

This is a U.S. national stage of application No. PCT/EP2008/064484 filed 10 Oct. 2008. Priority is claimed on Chinese Application No. 200710181439.9 filed 25 Oct. 2007, the content of which is incorporated herein by reference in its entirety.

BACKGROUND OF THE INVENTION

1. Field of the Invention

This invention relates to low power communication network technology and, more particularly, to a low power communication system and method for communicating in the low power communication network.

2. Description of the Related Art

U.S. Pub. No. 2005/0068928 AI discloses a conventional system and method for low power communication in a low power communication network.

In a low power communication network, such as a wireless sensor network (WSN), an individual network node is in a wake-up state (i.e. a transmitting state or receiving state, referred to also as an activated state) only for a short period of time, and is in a sleep state during the rest of time. In the sleep state, the network node only needs to keep the fundamental functional modules in an operational state (such as a wake-up timer), thus, the power consumption of the network node is merely the power needed in supporting the fundamental functional modules.

FIG. 1 shows a typical superframe (SF) structure in a low power communication network. Such a frame structure comprises a beacon frame, a wake-up period (data period) and a sleep period, wherein the wake-up period is also referred to as a data period, and the length of time of the superframe is represented by $t_{SF}$. A first network node as a data collecting end and a second network node as the data transmitting end communicate based on the superframe structure as shown in FIG. 1. As to the second network node, after it detects the beacon frame transmitted by the first network node, the second network node changes into the wake-up state from the sleep state (namely, enters the wake-up state from the sleep state) and starts to transmit first network node. After the data transmission, the second network node changes again into the sleep state (namely, enters the sleep state from the wake-up state) until it receives a next beacon frame and changes back again into the wake-up state to transmit the data. For this reason, in order to carry out data transmission with its neighboring network nodes, the network node must synchronize its wake-up period with that of the network node as its communication counterpart to ensure the successful communication between the two network nodes. The beacon frame is thus used to indicate the position of the wake-up period and also to synchronize the wake-up periods of the two network nodes.

In the low power communication network with a star topological structure as shown in FIG. 2, a network coordinator 100, here a network gateway, carries out communication with each of the network nodes, such as a network node 101, within the area covered by the network coordinator 100. The network coordinator transmits beacon frames periodically depending on its length of time of its superframe. Each of the network nodes in the area covered by the network coordinator synchronizes the data transmission between the network node and the network coordinator by scanning the beacon frames, i.e. synchronizes the wake-up period of the network node with the network coordinator. Besides being a network gateway to other networks, the network coordinator can also be a data source or a sink for data to be processed, and furthermore, can be a router for data exchange between network nodes.

It is known from U.S. Pub. No. 2005/0068928 A1 that the network nodes may passively scan, i.e., simply listen for beacon frames or, alternatively, send a probe request to the access point which, in turn, sends back a probe response in the form of a dummy beacon frame indicating the transmission time of the beacon frame (active scan). In the case where many, e.g., fifty, network nodes are being served by a single access point, a large number of probe requests may be generated, which may slow down the network and generate an unnecessary drain of power within the network nodes. Thus, in order to help conserve battery power and network resources, gratuitous probe responses (GPR) are interjected between the beacon frames to provide the network nodes with needed information in a more schedulable manner such that any individual network node may be powered up into an active mode to receive a beacon frame or a GPR at a target beacon transmission time or a target GPR transmission time.

Another description of the passive and active scanning is provided by Mike Baker et al: "Measurement Collection for Neighbor Tracking and Handover in an IEEE 802.11 Home Environment", 6th World Wireless Congress, May 2005, pages 196-201.

EP 1 548 984 A1 discloses a base station transmitting a main beacon indicating that all network nodes are allowed to perform transmission, and additionally transmitting a sub beacon (dummy beacon) in response to the successful reception of a data packet from a network node, where the dummy beacon includes the transmitting time of the main beacon. Thus, the network node may divide the next data packet if it is longer than the remaining time until the main beacon so that data transmission is finished before transmission of the main beacon is started, and thereby overlap of transmission timings of the beacon and the transmission data are prevented and the beacon interval can be fixed.

WO 2006/138058 A2 discloses transmitting full parent beacon frames periodically at a beacon frame rate for a particular network identifier from an access point. The access point further transmits mini-beacon frames in between consecutive full parent beacon frames for the particular network identifier, where each mini-beacon frame has a subset of information in the full parent beacon frame. The subset of information includes timing information on the next parent beacon frame, so that a network node associated to the access point can determine when the next full parent beacon frame is to be transmitted. The known method is particularly useful for an access point that supports multiple basic service set identifiers (BSSIDs), i.e., that can act as multiple virtual access points. As beacon frames can be quite large for multiple BSSID, the known method avoids the potential waste of bandwidth that would occur if only full-size beacons were broadcasted by the access point.

FIG. 3 is a schematic diagram of a situation of a mobile network gateway with a star topology moving in a network. Assume that a mobile network gateway (such as a mobile data collection device in WSN) passes through an area distributed with a plurality of wireless nodes (such as the sensing nodes in WSN, which are typically disposed in the network fixedly), and intends to communicate with all the wireless nodes in the area covered by the mobile network gateway. As shown in FIG. 3, a mobile network gateway moves from a first position to a second position, thus, the area covered by the mobile network gateway is changed from area 1 to area 2. In this case, the wireless nodes in area 1 include wireless nodes 1, 2, 3, 4, 5 and 6, and the wireless nodes in area 2 include wireless nodes 2, 3, 4, 5, 7, 8 and 9, with each wireless node represented by a single circle. The above-described beacon frame assisted wake-up synchronization method is not applicable to such a situation. Since the wireless nodes outside the area covered by the mobile network gateway cannot receive the beacon frame, these wireless nodes cannot be synchronized, and therefore cannot be in the sleep state. Furthermore, due to the mobility of the mobile network gateway, the wireless nodes entered into the area covered by the mobile network gateway have to monitor consecutively the communication link to detect at the appropriate time the beacon frame transmitted by the mobile network gateway, and therefore, they cannot be in the sleep state. As a consequence, the wireless nodes, the wake-up periods of which cannot be synchronized with that of the mobile network gateway, will have power consumptions of a much greater level than those the wake-up periods of which have been synchronized with that of the mobile network gateway. As for a typical low power network application situation in which wireless node devices are powered by batteries, this will cause not only a device maintenance period being too short (for example, the device needs to be charged too frequently), but also the wake-up periods between the mobile network gateway and the wireless nodes being unable to be synchronized promptly and efficiently.

SUMMARY OF THE INVENTION

It is therefore an object of the present invention to provide a communication method in a low power communication network, a corresponding low power communication network system and network nodes, so as to reduce the power consumption of the data transmission nodes in the low power communication network, and at the same time to ensure the communication efficiency of the low power communication network.

This and other objects and advantages are achieved in accordance with the present invention by a method for communication in a low power communication network, in which the network comprises a first network node and a second network node, where the first network node transmits a beacon frame that is used to indicate the time for data transmission by the first network node where the second network node detects the beacon frame to synchronize its data transmission with the first network node; and in which the method further comprises the first network node transmitting, before transmitting the beacon frame, a dummy beacon frame that is used to indicate the time for transmitting the beacon frame, and the second network node detecting the dummy beacon frame before detecting the beacon frame so as to acquire the time for transmitting the beacon frame, and carrying out data transmission with the first network node synchronously after having detected the beacon frame.

Optionally, said first network node transmits a plurality of dummy beacon frames consecutively before transmitting said beacon frame.

Preferably, said first network node transmits a plurality of dummy beacon frames intermittently before transmitting said beacon frame.

Depending on a particular application situation, said first network node transmits said beacon frame and said dummy beacon frame periodically.

Accordingly, after said second network node has detected either said dummy beacon frame or said beacon frame, it detects periodically said dummy beacon frame and said beacon frame.

Alternatively, after said second network node has detected either said dummy beacon frame or said beacon frame, it detects periodically said beacon frame.

When there are more than two of said first network nodes in the network, the period lengths for transmitting said beacon frame and said dummy beacon frame by each of said first network nodes are different from one another.

In which case, the period length for transmitting said beacon frame and said dummy beacon frame by each said first network node is respectively a preset value or is set by a network coordinator.

Furthermore, each said first network node monitors whether or not the other said first network nodes are transmitting said beacon frame or said dummy beacon frame before it transmits said dummy beacon frame, and it transmits said dummy beacon frame only when the other said first network nodes are not in transmission.

A low power communication network system, which system comprises a first network node and a second network node; said first network node is used to transmit a beacon frame, which beacon frame is used to indicate the time for data transmission by said first network node; and said second network node is used to detect said beacon frame so as to synchronize its data transmission with said first network node; and said first network node is also used to transmit before transmitting said beacon frame a dummy beacon frame, which is used to indicate the time for transmitting said beacon frame;

said second network node is also used to detect said dummy beacon frame before detecting said beacon frame so as to acquire the time for transmitting said beacon frame, and to carry out data transmission with said first network node synchronously after having detected said beacon frame.

A data collection node in a low power communication network, said data collection node is used to transmit a beacon frame which is for indicating the time for data transmission by said data collection node; and said data collection node is also used to transmit before transmitting said beacon frame a dummy beacon frame, which is used to indicate the time for transmitting said beacon frame.

Optionally, said data collection node is used to transmit a plurality of dummy beacon frames consecutively before transmitting said beacon frame.

Preferably, said data collection node is used to transmit a plurality of dummy beacon frames intermittently before transmitting said beacon frame.

Optionally, said data collection node is used to transmit said beacon frame and said dummy beacon frame periodically.

When there are more than two said data collection nodes in said network, the period lengths for transmitting said beacon frame and said dummy beacon frame by each of said data collection nodes are different from one another.

Furthermore, each said data collection node is used to monitor whether or not the other said data collection nodes are transmitting said beacon frame or said dummy beacon frame before it transmits said dummy beacon frame, and it transmits said dummy beacon frame only when the other data collection nodes are not in transmission.

A data transmission node for communication with the data collection node, which data transmission node is used to detect said beacon frame; and said data transmission node is also used to detect said dummy beacon frame before detecting said beacon frame so as to acquire the time for transmitting said beacon frame, and to carry out data transmission with said data collection node synchronously after having detected said beacon frame.

In summary, the advantageous results brought about by the present invention include:

the data transmission nodes using the present invention have lower power consumption and can be synchronized more quickly to the wake-up period with the data collection nodes. A plurality of data collection nodes utilizing the present invention have a low probability of conflicting during a transmission. A low power communication network utilizing the present invention has relatively low power consumption and a relatively high communication efficiency. At the same time, the present invention is simple to implement and can be implemented on the basis of standard components, so it has quite good applicability.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

To make the objects, technical solutions and advantages of the present invention more apparent, the present invention will be further described hereinbelow in detail with reference to the accompanying drawings, in which.

DETAILED DESCRIPTION OF THE PREFERRED EMBODIMENTS

The core concept of the present invention is that, in consideration that the restriction of the power of the mobile gateway in a low power communication network is not so strict as that of a wireless node, in order to allow the wireless nodes to be in the sleep state for as much time as possible and to be able to detect the beacon frame quickly so as to synchronize the wake-up period with that of the mobile gateway after entering into the area covered by the mobile gateway, the mobile gateway according to the present invention sends at least a dummy beacon frame before transmitting a beacon frame, said dummy beacon frame is used to indicate the transmitting time of the beacon frame, while the wireless node according to the present invention can acquire the transmitting time of the beacon frame by detecting the dummy beacon frame, and further synchronizes the data period with that of the mobile gateway after having detected the beacon frame, so that the probability of success in detecting the beacon frame by the wireless node is significantly improved and the power consumption of the wireless node is reduced, while the communication efficiency of the low power network is guaranteed.

Figure 1:
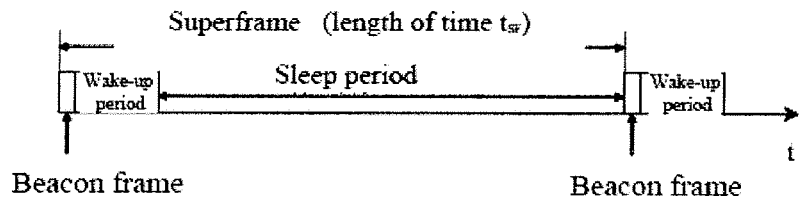
FIG. 1 is the frame structure of a typical superframe in a low power communication network.
Figure 2:
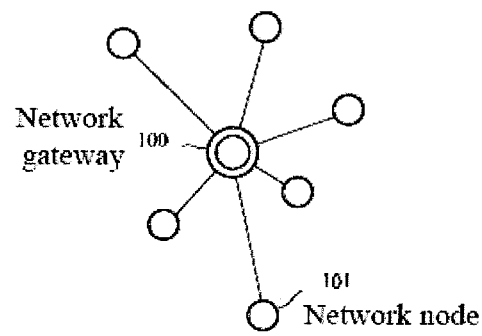
FIG. 2 is a schematic diagram of a low power communication network having a star topological structure.
Figure 3:
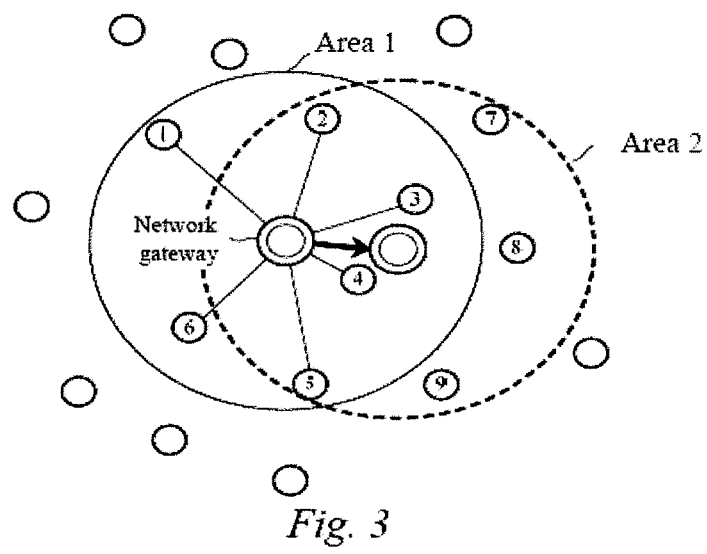
FIG. 3 is a schematic diagram of a situation of a mobile network gateway moving in a low power communication network having a star topological structure.
Figure 4:
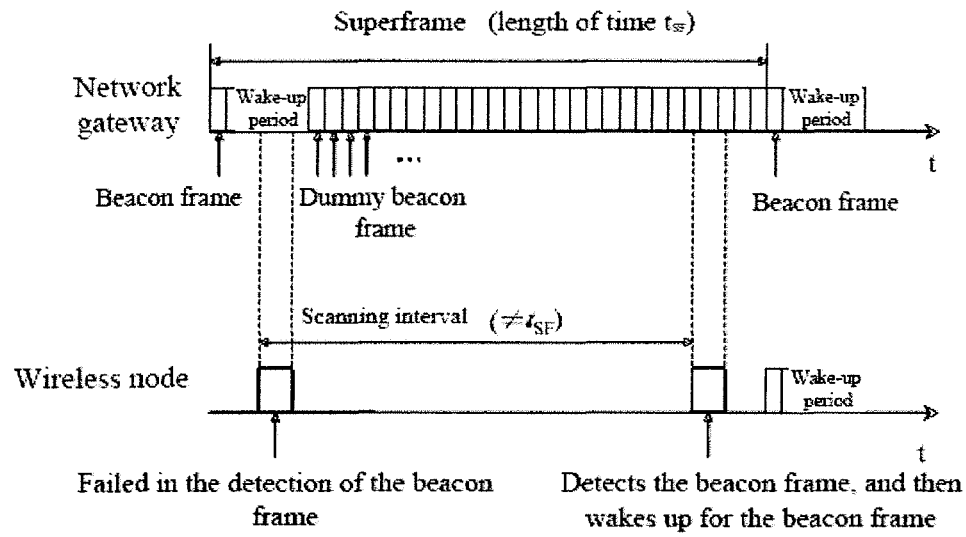
FIG. 4 is a schematic diagram of a superframe structure and a process for wake-up synchronization according to an embodiment of the present invention.

FIG. 4 shows a schematic diagram of the superframe structure and the process of a synchronized wake-up period of a wireless node with a mobile network gateway according to an embodiment of the present invention. In this embodiment, as shown in FIG. 4, the superframe is $t_{SF}$, which is the same as in the structure of a prior art superframe, and comprises also a beacon frame, a wake-up period and a sleep period, the mobile network gateway indicates the position of its wake-up period by transmitting a beacon frame, and the wireless node synchronizes its wake-up period with that of the mobile network gateway by detecting the beacon frame, so as to establish a data communication with the mobile network gateway.

On this basis and according to the present invention, the mobile network gateway will also send a dummy beacon frame before transmitting the beacon frame, and the dummy beacon frame is used to indicate the transmitting time of the beacon frame, so that the wireless node carries out detection of both the dummy beacon frame and the beacon frame before detecting the beacon frame, that is to say, it can acquire the transmitting time of the beacon frame by detecting the dummy beacon frame, so as to improve the probability of success for the detection of the beacon frame, and furthermore, it synchronizes its wake-up period with that of the mobile network gateway after having detected the beacon frame to carry out the data transmission with the mobile network gateway. In this embodiment, as shown in FIG. 4, the mobile network gateway consecutively transmits dummy beacon frames during the sleep period in the superframe structure, wherein the dummy beacon frames can have specifically-defined formats, or employ the same format as that of the beacon frame, so that when the wireless node detects one of the dummy beacon frames, it can acquire the transmitting time of the beacon frame, and then further detect the beacon frame to synchronize the wake-up period of the wireless node with that of the mobile network gateway.

Optionally, the mobile network gateway can also intermittently send dummy beacon frames during the sleep period, so that the power consumption of the mobile network gateway is reduced on the basis of ensuring that the wireless node can synchronize its wake-up period with that of the mobile network gateway.

In this embodiment, depending on different application situations, the mobile network gateway can also send periodically the dummy beacon frames and the beacon frames based on the superframe structure as shown in FIG. 4, at that time, the information on the length of time of the superframe can be furthermore carried in the beacon frame. The wireless node can scan the dummy beacon frame at different time intervals with respect to the length of time of the superframe $t_{SF}$ (i.e. the scanning time intervals shown in FIG. 4) before synchronizing its wake-up period with that of the mobile network gateway. Here the different time between the scanning interval and the length of time of the superframe refers to the case that the scanning time interval is not equal to and is not an integral time of the length of time of the superframe, which can ensure that when one detection period occasion for a dummy beacon frame of a wireless node falls within the wake-up period of the mobile network gateway, then the next detection period occasion for the dummy beacon frame of the wireless node can keep away from the wake-up period of the mobile network gateway, so that a dummy beacon frame can be detected. After a wireless node has detected a dummy beacon frame and then a beacon frame, the wireless node can periodically detect the dummy beacon frames and beacon frames according to the information on the length of time of the superframe carried in the beacon frame, or can periodically detect the beacon frame only and thus, can synchronize its wake-up period with that of the mobile network gateway.

Accordingly, in this embodiment, a low power communication network can comprise a mobile network gateway and a wireless node. As a data collection node, the mobile network gateway is used to send the beacon frames, which beacon frames are used to indicate the data transmission time of the first network node. As a data transmission node, the wireless node is used to detect the beacon frame so as to synchronize the data transmission between the wireless node and the mobile network gateway. On the basis of such a function, the mobile network gateway is further used to transmit a dummy beacon frame before transmitting the beacon frame, which dummy beacon frame is used to indicate the transmitting time of the beacon frame. The wireless node is further used to detect the dummy beacon frame before detecting the beacon frame to acquire the transmitting time of the beacon frame, and to carry out data transmission with the mobile network gateway synchronously after the wireless node has detected the beacon frame.

Specifically, the mobile network gateway can be used to transmit a plurality of dummy beacon frames consecutively before transmitting the beacon frame, or, preferably, the mobile network gateway is used to transmit a plurality of dummy beacon frames intermittently before transmitting the beacon frame, so that the power consumption of the mobile network gateway is reduced on the basis of ensuring that the wireless node is able to synchronize its wake-up period with that of the mobile network gateway.

Depending on particular application situations, the mobile network gateway can also be used to send periodically the dummy beacon frame and the beacon frame based on the length of time of the superframe $t_{SF}$, in this case, the information on the length of time of the superframe can be furthermore carried in the beacon frame. Accordingly, the wireless node can also be used to scan for the dummy beacon frame at different time intervals with respect to the length of time of the superframe $t_{SF}$ before synchronizing its wake-up period with that of the mobile network gateway, and after having detected a dummy beacon frame and then a beacon frame, the wireless node can periodically detect the dummy beacon frames and beacon frames according to the information on the length of time of the superframe carried in the beacon frame, or it can periodically detect the beacon frame only, thus, synchronizing its wake-up period with that of the mobile network gateway.

By adopting the above embodiment according to the present invention, and with the selection of a suitable scanning interval depending on the length of time of the superframe, the wireless node previously outside the area covered by a mobile network gateway can usually complete the synchronization of the wake-up period by detecting once or twice the dummy beacon frame and within a single length of time of the superframe after having entered into the scope covered by the mobile network gateway. In which case, lower power consumption by the wireless node can be achieved by selecting a longer scanning interval for the wireless node.

Another technical solution according to the present invention is described below with reference to FIG. 5, which solution is mainly applicable to the application situations where there are a plurality of mobile network gateways in an area of a low power communication network.

In this embodiment, the coverage of a network gateway 1 and a network gateway 2 coincide with each other, the length of time of the superframe employed network gateway 1 is $t_{SF}1$, the length of time of the superframe employed network gateway 2 is $t_{SF}2$, and both of the corresponding superframe structures comprise beacon frames, wake-up periods and sleep periods, and both of the network gateway 1 and network gateway 2 send dummy beacon frames in the sleep periods. The network gateway 1 and network gateway 2 can consecutively send a plurality of dummy beacon frames in the sleep periods and preferably, as shown in FIG. 5, the network gateway 1 and network gateway 2 will intermittently send the dummy beacon frames randomly or in a predetermined manner, and the densities of these dummy beacon frames can be optimized on the specific requirements of the system. In which case, a higher density of the dummy beacon frames will lead to a higher probability of transmission conflict between the network gateway 1 and network gateway 2, while a lower density of the dummy beacon frames will increase the average synchronization time delay during the synchronization wake-up periods of the wireless nodes and the network gateway 1 and network gateway 2.

The wireless nodes in the coverage area of the network gateway 1 and network gateway 2 can detect respectively the dummy beacon frames sent by the network gateway 1 and network gateway 2, then detect the beacon frames sent by the network gateway 1 and network gateway 2 and synchronize its wake-up period with that of the network gateway 1 and network gateway 2.

Figure 5:
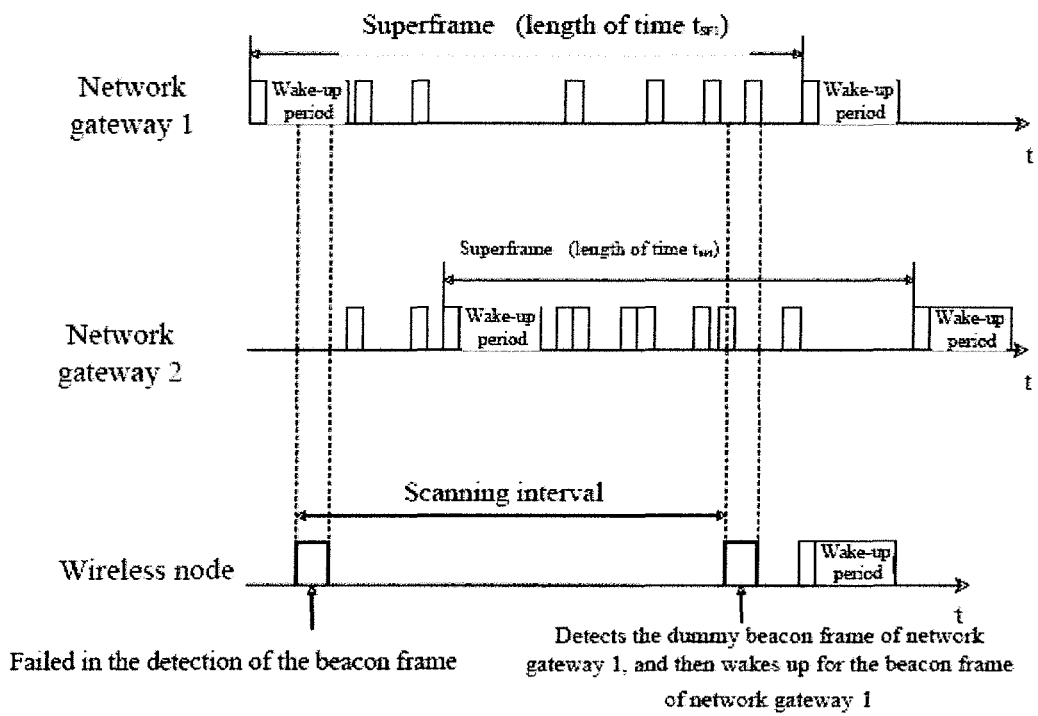
FIG. 5 is a schematic diagram of a superframe structure and a process for wake-up synchronization according to another embodiment of the present invention.

Depending on specific application situations, the network gateway 1 and network gateway 2 can also send periodically the dummy beacon frame and the beacon frame based on the superframe structure as shown in FIG. 5, in this case, the information on the length of time of the superframe can be further carried in the beacon frame. In order to reduce the probability of the transmitting conflict between the network gateway 1 and network gateway 2, the length of period for each network gateway to transmit the beacon frame and the dummy beacon frame is different from each other, here the difference between the length of period means the different lengths of periods are neither equal nor in a relationship of integral times. Each length of period can be a preset value or can be set by the network coordinator to which the network gateway 1 and network gateway 2 belong, in this way, when there is a conflict between the network gateway 1 and network gateway 2, the next transmitting time of the network gateway 1 and network gateway 2 will keep away from one another due to the different lengths of period. Furthermore, each of the network gateways can first monitor whether or not the other network gateway is transmitting the beacon frame or the dummy beacon frame before transmitting the beacon frame or the dummy beacon frame, and only sends the dummy beacon frame or the beacon frame when the other network gateway is not transmitting, so as to further reduce the probability of the transmitting conflict between the network gateways.

Accordingly, in this embodiment, a low power communication network system can comprise the network gateway 1 and the network gateway 2, and wireless nodes which need to communicate with the network gateway 1 and the network gateway 2. The corresponding functions of said network gateway 1, said network gateway 2 and the wireless nodes are the same as those described in the above embodiment and shall not be further described redundantly. On the basis of this, in order to reduce the probability of the transmitting conflict between the network gateway 1 and the network gateway 2, the lengths of period $t_{SF}1$ and $t_{SF}2$ for each of the network gateways to transmit the beacon frame and the dummy beacon frame can be different from each other. In addition, the network gateways can first monitor whether or not the other network gateway is transmitting the beacon frame or the dummy beacon frame before transmitting the dummy beacon frame or the beacon frame, and only sends the dummy beacon frame or the beacon frame when the other network gateway is not transmitting, so as to further reduce the probability of the transmitting conflict between the network gateways. Accordingly, the wireless nodes in the coverage area of the network gateway 1 and the network gateway 2 can be used to scan the dummy beacon frame at different time intervals with respect to the length of time of the superframe before synchronizing its wake-up period with that of each of the mobile network gateways, and after having detected a dummy beacon frame and then a beacon frame, the wireless node can periodically detect the dummy beacon frames and the beacon frames according to the information on the length of time of the superframe carried in the beacon frame, or can periodically detect the beacon frame only and thus, synchronize its wake-up period with that of network gateway 1 or network gateway 2.

In each of the above embodiments according to the present invention, only the mobile network gateway is required to be in the activated state continuously to limit the high power consumption to the mobile network gateway, while the mobile network gateway usually has a high battery capacity and is easy to maintain (such as to recharge), therefore, it is suitable for most of the application situations.

A typical application situation for the above embodiments is a WSN network. Assume that a large number of sensors (equivalent to the wireless nodes in the embodiments) are deployed in a large area, and these sensors are powered by batteries and responsible for collecting environment data (for example, information on traffic or weather). A mobile data collecting device (equivalent to the mobile network gateway in the embodiments) goes through the area where the large number of sensors are deployed and checks the data of each sensor. The data collecting device can be installed in a train or a vehicle moving regularly. By utilizing the present invention, the power consumption by the sensors can be significantly reduced so that the lifetime of the batteries in the sensors can be greatly improved.

The present invention can also be used in the field of working environment safety. In dangerous working areas, such as mines, the sensors (equivalent to the wireless nodes) are used to monitor the working environment (such as the density of a gas), and operators carrying mobile devices (equivalent to the mobile network gateway) can acquire the data of the working environment from various sensors deployed within the working area when passing through the present working area.

Furthermore, the embodiments of the present invention can also be used in low power communication networks with fixed data collection nodes, so as to reduce the probability of transmitting conflict between the data collection nodes, and at the same time, reducing the time for synchronization of the wake-up periods of the data transmitting nodes with the data collection nodes.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for communication in a low power communication network, in which said network comprises a first network node and a second network node, the method comprising:
   transmitting, by said first network node, a beacon frame periodically indicate the indicating a time for data transmission by said first network node;
   transmitting, by said first network node, a dummy beacon frame indicating the transmitting time of said beacon frame before transmitting said beacon frame, said second network node including a wake-up state and a sleep state and, when awake, is configured to detect said dummy beacon frame, detect said beacon frame and perform data transmission with said first network node;
   detecting, by said second node, said dummy beacon frame so as to acquire the transmitting time of said beacon frame and synchronize its data transmission with said first network node by performing the data transmission with said first network node in a wake-up period synchronously after detecting said beacon frame;
   transmitting, by the first network node, the dummy beacon during a sleep period following the wake-up period until a next beacon frame;
   scanning the second network node for the dummy beacon frame at time intervals which are different from and not an integral of a period length for transmitting said beacon frame; and
   detecting, by the second network node, only the beacon frame upon one of detecting the beacon frame and detecting the dummy beacon frame, and upon acquiring the transmitting time of the beacon frame.

2. The method as claimed in claim 1, wherein said first network node transmits a plurality of dummy beacon frames consecutively before transmitting said beacon frame.

3. The method as claimed in claim 1, wherein said first network node transmits a plurality of dummy beacon frames intermittently before transmitting said beacon frame.

4. The method as claimed in claim 1, wherein when more than two of said first network nodes are present in the network, period lengths for transmitting said beacon frame and said dummy beacon frame by first network nodes are different from one node to another.

5. The method as claimed in claim 4, wherein the period length for transmitting said beacon frame and said dummy beacon frame by each of said first network nodes is respectively one of a preset value and is set by a network coordinator.

6. The method as claimed in claim 4, wherein each of said first network nodes monitors whether each other of said first network nodes is transmitting said beacon frame or said dummy beacon frame before transmitting said dummy beacon frame, each of said first network nodes transmitting said dummy beacon frame only when the other of said first network nodes is not transmitting.

7. A low power communication network system, comprising:

a first network node configured to periodically transmit a beacon frame indicating a time for data transmission by said first network node, and configured to transmit, before transmitting said beacon frame, a dummy frame indicating a transmitting time of said beacon frame; and a second network node including a wake-up state and a sleep state, the second network node being configured to, when awake, detect said dummy beacon frame, detect said beacon frame and perform data transmission with said first network node, said second network node being further configured to detect said dummy beacon frame so as to acquire the transmitting time of said beacon frame and to synchronize its data transmission with said first network node by performing the data transmission with said first network node in a wake-up period synchronously after detecting said beacon frame; and wherein the first network node, during a sleep period, transmits the dummy beacon, following the wake-up period until a next beacon frame;

wherein the second network node scans for the dummy beacon frame at time intervals which are different from and not an integral of the period length for transmitting said beacon frame; and wherein the second network node detects only the beacon frame upon one of detecting the beacon frame and detecting the dummy beacon frame, and upon acquiring the transmitting time of the beacon frame.

* * * * *